Jan. 31, 1928.
L. K. HEINER ET AL
1,657,826
FLUID CLUTCH
Filed Jan. 7, 1927
3 Sheets-Sheet 3
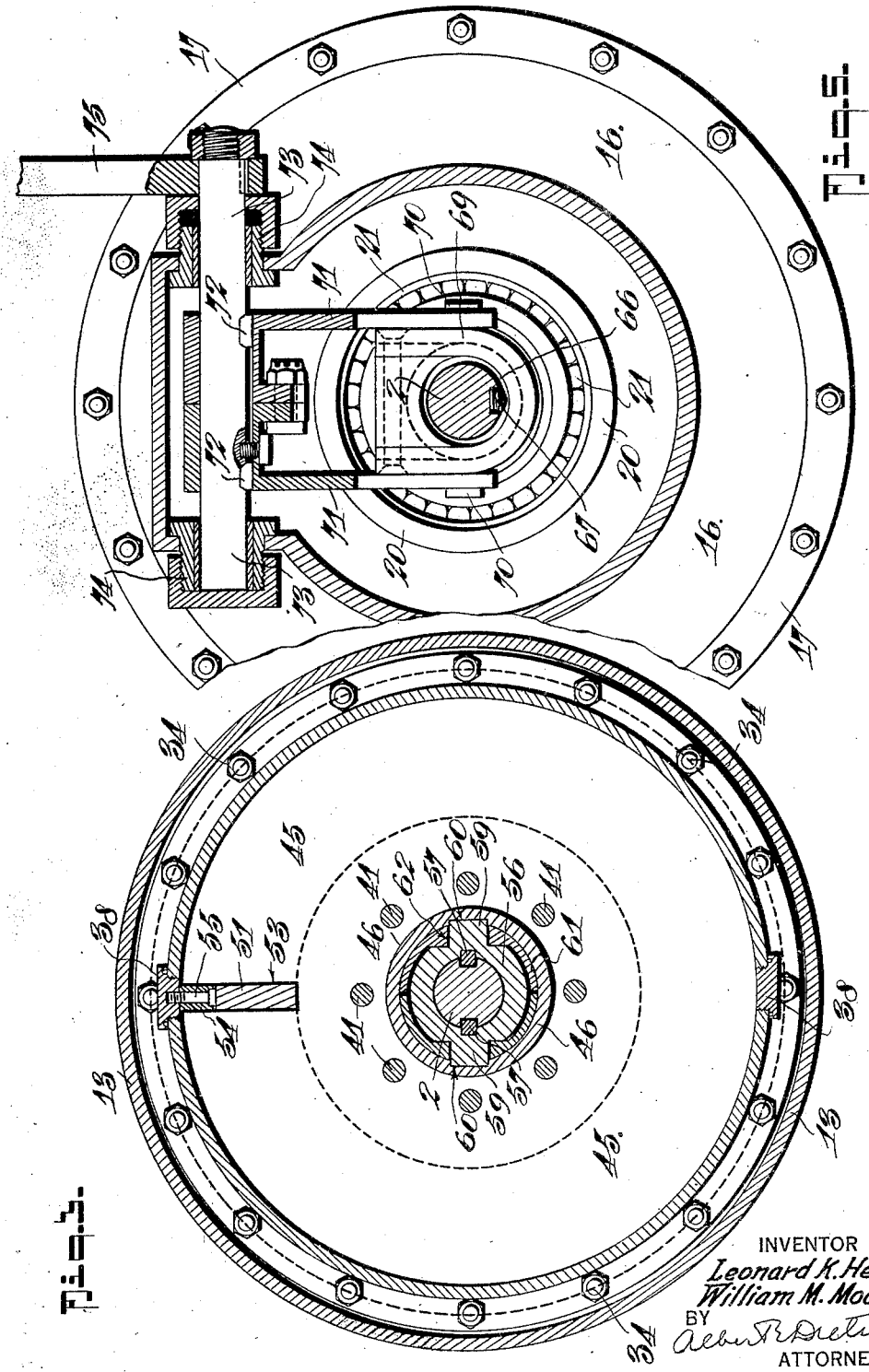
INVENTOR
Leonard K. Heiner
William M. Moore
BY
ATTORNEY Patented Jan. 31, 1928.

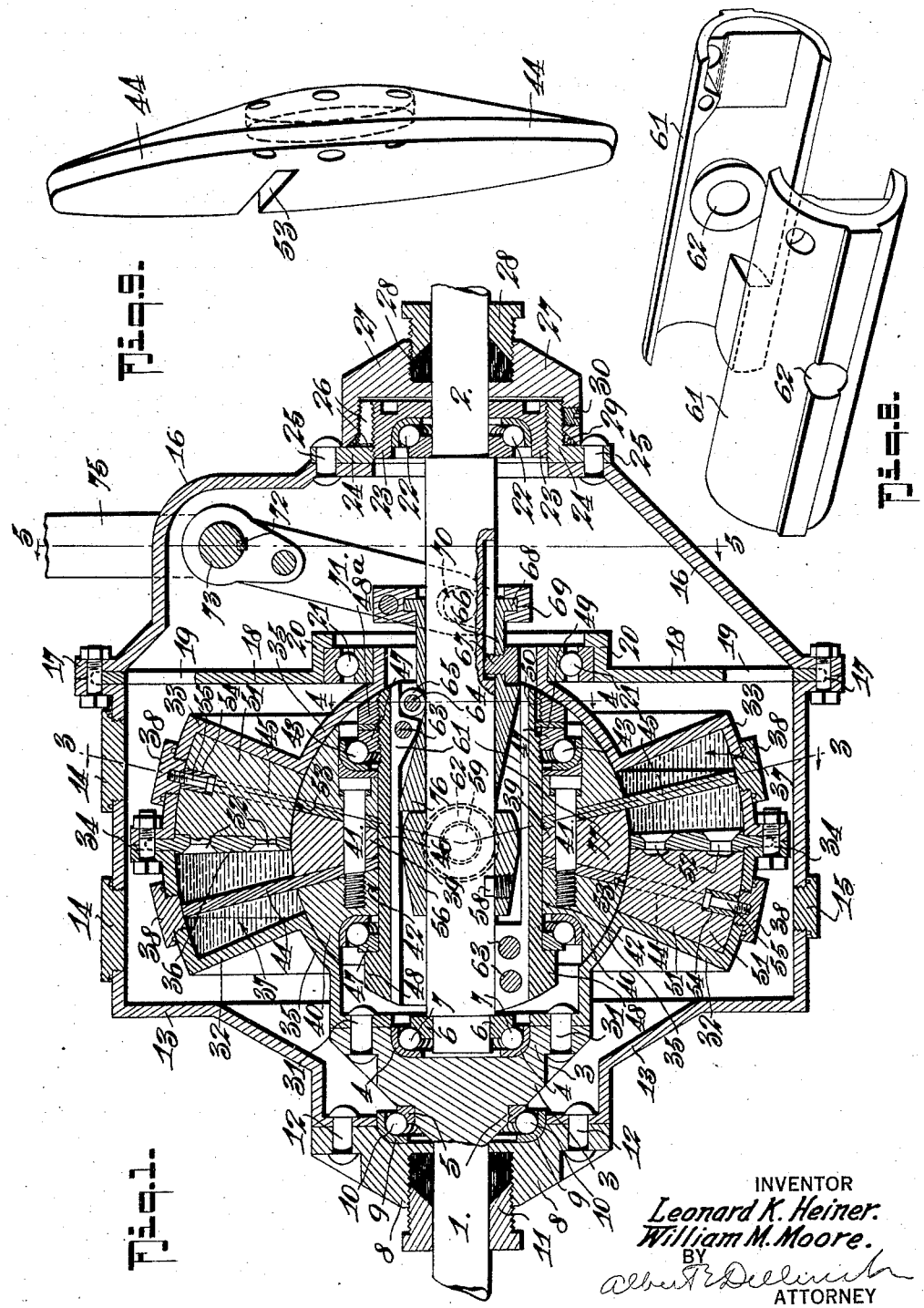

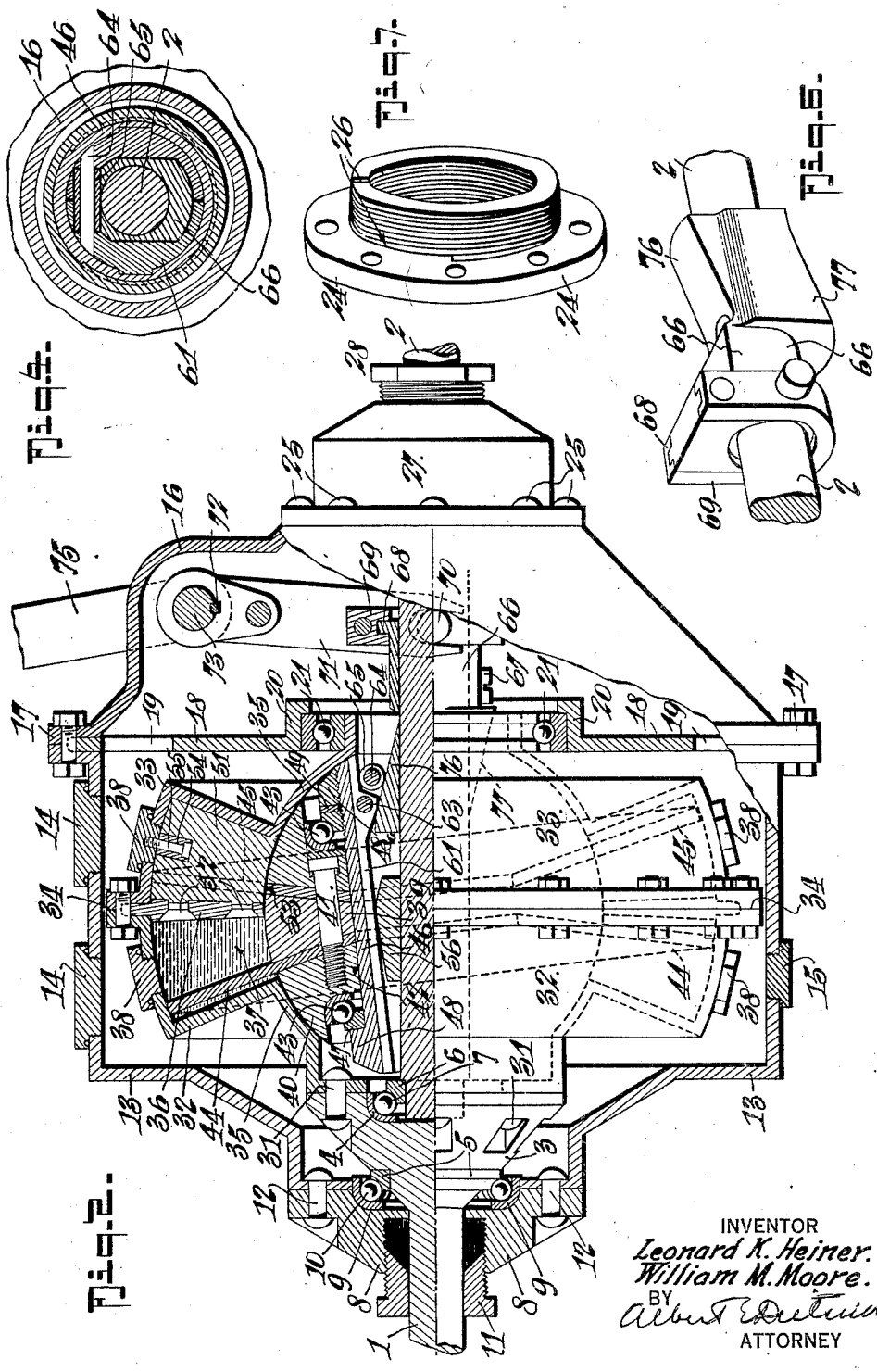

1,657,826

UNITED STATES PATENT OFFICE.

LEONARD KENNETH HEINER AND WILLIAM McKINLEY MOORE, OF PHILLIPSBURG, KANSAS, ASSIGNORS OF ONE-FOURTH TO ALBERT L. ELLIOT, OF PHILLIPSBURG, KANSAS.

FLUID CLUTCH.

Application filed January 7, 1927. Serial No. 159,633.

The invention primarily has for its object to provide a new and improved fluid clutch mechanism in which the constituent parts are simple in construction and capable of economical manufacture, compact, and so arranged that desired efficient operation is assured without loss of energy due to the conventionally common necessity of pumping the impounded fluid through restricted openings in attainment of the clutching operation.

The invention further seeks to provide a structure of the character stated in which the parts are so designed and assembled as to be entirely counter-balanced, eliminating all unbalanced, off-center weight.

In its more detailed nature the invention resides in the provision of a new and improved fluid clutch mechanism comprising a driving shaft, a shaft-to-be-driven, means carried by the driving shaft and associated with the driven shaft and including shiftable fluid-resisted elements, freely movable when shifted to a movement non-effecting position but active when shifted to movement effecting positions to apply torque to the shaft-to-be-driven in degree according to the load on said shaft-to-be-driven and the fluid resistance set up by the particular shift of said elements.

With the above and other objects in view that will hereinafter appear, the invention still further resides in the novel details of construction, combination and arrangement of parts, all of which will be first fully described, then be particularly pointed out in the appended claims, reference being had to the accompanying drawings, in which:—

Figure 1 is a vertical longitudinal section illustrating the invention in the idling or no rotation imparting position.

Figure 2 is a view similar to Figure 1, parts being in elevation, and illustrates the maximum torque applying position of the parts for imparting maximum speed to the driven shaft.

Figure 3 is a cross section taken on the line 3—3 on Figure 1.

Figure 4 is a detail cross section taken on the line 4—4 on Figure 1.

Figure 5 is a cross section taken on the line 5—5 on Figure 1.

Figure 6 is a detail perspective view of the shifter elements slidable on the driven shaft.

Figure 7 is a detail perspective view illustrating the driven shaft bearing securing lock washer.

Figure 8 is a detail perspective view showing the shifter element guide sleeve parts disassembled.

Figure 9 is a detail perspective view illustrating one wobbler disk.

In the following detailed description the invention is particularly disclosed in one only of its many possible adaptations as a fluid clutch mechanism for imparting rotation from a driving shaft to a driven shaft at varying speeds according to the needs and desire of the operator. It should be understood however that other uses to which the structure disclosed may be adapted are herein comprehended, as for example a drive shaft brake, a line shaft clutch, a lifting or lowering device clutch, or in fact any use occasioning the application of energy from one shaft to another in adjustable degree, or where a rotating shaft must be retarded or stopped.

By reference to the drawings in which like numerals of reference indicate like parts in all of the figures, it will be seen that 1 indicates the driving shaft to which rotation is imparted from any source according to the use to which the device is being put, as for example an automobile engine, and 2 the shaft-to-be-driven which is mounted in axial alignment with the driving shaft and indirectly connected with said driving shaft through the mechanism forming the principal part of the invention and through the medium of which the driven shaft may be permitted to remain motionless or caused to rotate at a desired speed relatively to and with the driving shaft.

The shaft 1 is provided with a head 3 recessed to receive the ball race 4 and is provided with a bearing ring 5.

The end of the shaft 2 adjacent the shaft 1 is shouldered to receive the bearing ring 6 which coacts with the race 4 in receiving the bearing balls 7, forming a suitable bearing for the said shaft end in axial alignment with the shaft 1.

A bearing head 8, recessed to receive a ball race 9 and bearing balls 10 coacts with the bearing ring 5 in forming a suitable bearing for the end of the shaft 1 and is equipped with a gland 11 through which said shaft end passes. The head 8 is secured at 12 to the main casing body 13, the main body portion of which is cylindrical and provided with filler plugs 14 and a drain plug 15.

An extension housing 16 is secured to the main housing 13 by the flange connection 17, and between the flanges is secured a partition wall 18 provided with intercommunicating openings 19 and a central flanged opening 20 equipped with the ball race and bearing balls 21 the purpose of which will presently appear.

The remaining end of the shaft 2 projects through an opening in the casing extension 16, suitable ball bearings being provided therefor as at 22 in the threaded washer 23 adjustable in the flanged head 24 secured at 25 to the extension 16. The washer 23 is adjustable to take up play in the bearings 22, 7, and 10. To provide for securing the washer at desired adjustments the flange of the head 24 into which it is threaded is split in two directions as at 26 (see Figure 7) and taper-threaded to receive the internally taper-threaded head 27 provided with a gland 28 through which the shaft 2 passes and a tapered seat and packing 29. A set screw 30 may be employed to secure the head 27 against inadvertent rotation.

Secured as at 31 to the driving shaft head 3 is one half 32 of a two-part housing, the other half 33 being flange secured as at 34 to the first half. This composite housing is shaped to comprise a central hollow globe-like portion 35 to snugly fit and form a universal bearing for a wobbler head, hereinafter to be described in detail, and an extended annular chamber portion divided, by a partition plate 36 clamped between the flanges of the halves, into two substantially fluid tight annular fluid chambers 37 in each of which a wobbler disk carried by the wobbler head operates in a manner soon to be described.

Each compartment is accessible for filling or emptying fluid (heavy oil preferably) into or from the composite housing through a plurality of fluid tight screw plugs 38.

The wobbler head which has universal bearing in the composite housing portion 35 is constructed of three annular rings, a central ring 39 and two outer rings 40, all being securely clamped together by clamp screws 41, collectively providing a ball-like outer surface to snugly-movably fit the said housing portion 35 and having a central axial bore 42 and end recesses to accommodate the ball and ball race equipment 43.

Two wobbler disks 44 and 45 are carried by the wobbler head, each operable in one annular fluid chamber 37 of the composite housing. The disks are frusto-coniform, the centers or apexes being cut away to assist in forming the central bore 42, and they are placed back to back so that their imaginary centers, which would be formed by the apexes, are coincident. Thus any given radius of one disk aligns a diametrically opposite radius of the other disk and an imaginary line drawn through such radii will pass through the imaginary center of both disks which is also the geometrical center of the wobbler head. The peripheral edges of the disks snugly fit within the peripheral walls of the chambers 37.

A steel tube 46 is rotatably mounted in the bore 42 of the wobbler head by reason of having the bearing cones 47 carried thereby in association with the bearing equipment 43. The sleeve has a fixed head 48 at one end and is threaded at its other end to adjustably receive one of the cones 47 and a jamb nut 48ª, a lock washer 49 being interposed and provided with a rotation preventing teat to enter the slot 50 with which the sleeve is equipped. By this equipment means is provided to prevent undesirable play in the bearings 43.

As hereinbefore stated the annular chambers 37 are filled with a suitable resistance fluid, preferably heavy oil, and each chamber is provided with a cross or abutment wall 51 secured as at 52 to the partition wall or plate 36 and designed to obstruct free annular circulation of the oil. The walls 51 are preferably diametrically oppositely positioned in their respective chambers to provide oil surge balance, and snugly fit across the chambers to completely obstruct them.

Each disk 44 and 45 is provided with a slot 53 to snugly straddle its cooperative partition wall 51 and it will be observed that the said disks and the wobbler head rotate with the shaft 1 and composite housing 32—33 but are not free to rotate within that housing but only to wobble therein when said housing is rotated under certain conditions soon to be described.

Certain of the filler and drain caps 38 may be positioned at the positions of the walls 51 if desired to communicate with the chambers 37 at both sides of the same and in this case, to facilitate such communication, each wall 51 may have a snugly fitting removable section 54 secured to the respective cap by a screw 55 rotatable in the said plug so that when the cap is removed the plug will be removed with it, and returned to position when the cap is again returned.

When the sleeve 46 and the wobbler head and disks rotatable thereon are positioned as illustrated in Figure 1 of the drawings, the said sleeve being concentric to or coaxial with the driven shaft 2, the composite housing and wobbler unit rotate freely on said sleeve and with the driving shaft 1, no wobbling of the wobbler unit is caused, and no rotation is imparted to shaft 2.

The sleeve 46 is, however, positively connected to the shaft 2 through means soon to be described so that when that sleeve is rotated the shaft 2 will be rotated. To this end means is provided for tilting the sleeve out of concentric relation with the shaft 2, causing the wobbler unit to wobble under varying strong resistance set up by the heavy oil in degree according to the tilt of the sleeve and the disks 44—45, and the application of torque to the shaft 2 to rotate the same at speeds relating to that of the drive shaft in accordance with the tilt and resistance set up by the particular adjustment.

To accomplish this purpose, a rounded head 56 is keyed as at 57 on the shaft 2 and secured as at 58 against longitudinal movement. This head has laterally projecting trunnions 59 and the axis of these trunnions passes through the imaginary center of the wobbler unit. The sleeve 46 has opposite slots 60 to receive the ends of the trunnions and a two-part sleeve member 61 snugly fits the sleeve 46 and surrounds the head 56. The halves of the sleeve member 61 each have an aperture 62 to fit a respective trunnion 59, are secured together when mounted by pins 63, and conjointly mount a bearing pin 64 on which a cam roller 65 is rotatably mounted.

A shifter sleeve 66 is slidable but not rotatable on the shaft 2 by reason of the set screw and longitudinal slot equipment 67. The sleeve has an end flange 68 rotatable in a groove in the shifter head 69 which has trunnions 70 engaged by the forked arms 71 secured as at 72 on the rocker shaft 73 mounted in bearing 74 provided in the housing extension 16 and by which the said sleeve may readily be shifted through the medium of the operating arm 75 secured on one end of the shaft 73 projected outside the housing.

The sleeve 66 is equipped with an upper advancing cam 76, adapted to engage the roller 65 to tilt the sleeve 46 and wobbler unit, and a lower receding cam 77 which recedes from the lower edge of the sleeve as the tilting is being accomplished.

When the parts are positioned as in Figure 1 the drive shaft, the composite housing and the wobbler unit rotate freely on the sleeve 46. As the sleeve is tilted, the disks 44-45, moving with the same out of their centered relation in their respective oil chambers 37, will be caused to wobble under the resistance set up by the heavy oil and because of the tilt and will apply torque to the shaft 2.

Obviously, the more the sleeve is shifted, the more accentuated will be the wobble occasioned by the heavy oil resistance to free movement, and the shaft 2 will be driven at a speed approximating that of the driving shaft 1 in degree according to the load on the said shaft 2 and the degree of wobble of the wobbler unit.

It is to be understood, of course, that the main housing 13, 16 is stationarily supported in any suitable manner and is filled with a suitable lubricant, the caps 14 serving for the administration of such lubricant and the cap 15 to drain it from the housing.

From the foregoing description, taken in connection with the accompanying drawings, it is thought that the novel details of construction, manner of operation, and the advantages of the invention will be readily apparent to those skilled in the art to which it relates.

What we claim is:

1. In apparatus of the class described, a drive shaft, a shaft to be driven positioned in axial alignment with the drive shaft, a liquid filled housing carried by the drive shaft and rotatable therewith, and a wobbler unit wobble-mounted in the housing and adjustably associated with the driven shaft whereby when positioned in one position said wobbler unit will rotate freely about said driven shaft, but when moved to other positions will be caused to wobble in degree according to its adjusted position and apply torque to the shaft to be driven according to the resistance of the liquid, and means in the liquid filled housing to obstruct free circulation of the liquid therein.

2. In apparatus of the class described, a drive shaft, a shaft to be driven positioned in axial alignment with the drive shaft, a liquid filled housing carried by the drive shaft and rotatable therewith, and a wobbler unit wobble-mounted in the housing and adjustably associated with the driven shaft whereby when positioned in one position said wobbler unit will rotate freely about said driven shaft, but when moved to other positions will be caused to wobble in degree according to its adjusted position and apply torque to the shaft to be driven according to the resistance of the liquid, means in the liquid filled housing to obstruct free circulation of the liquid therein, and said wobbler unit having slotted portions associated with said circulation obstructing means to permit wobbling of said unit within and relative to said housing while preventing rotation of said unit relative to and within said housing.

3. In apparatus of the class described, a drive shaft, a shaft to be driven positioned in axial alignment with the drive shaft, a liquid filled housing carried by the drive shaft and rotatable therewith, and a wobbler unit wobble-mounted in the housing and adjustably associated with the driven shaft whereby when positioned in one position said wobbler unit will rotate freely about said driven shaft, but when moved to other positions will be caused to wobble in degree according to its adjusted position and apply torque to the shaft to be driven according to the resistance of the liquid, at least one cross partition wall in the liquid filled housing to obstruct free circulation therein, a liquid filler and closure cap secured in the housing and of a diameter for serving the filling of liquid into or draining of liquid out of the housing at each side of the partition wall.

4. In apparatus of the class described, a drive shaft, a shaft to be driven positioned in axial alignment with the drive shaft, a liquid filled housing carried by the drive shaft and rotatable therewith, and a wobbler unit wobble-mounted in the housing and adjustably associated with the driven shaft whereby when positioned in one position said wobbler unit will rotate freely about said driven shaft, but when moved to other positions will be caused to wobble in degree according to its adjusted position and apply torque to the shaft to be driven according to the resistance of the liquid, at least one cross partition wall in the liquid filled housing to obstruct free circulation therein, a liquid filler and closure cap secured in the housing and of a diameter for serving the filling of liquid into or draining of liquid out of the housing at each side of the partition wall, said partition wall having a slotway therethrough in axial alignment with the filler and closure cap, and a plug carried by said cap and adapted when mounted to close the said slotway and when removed to facilitate filling or draining of the housing by opening said slotway.

5. In apparatus of the class described, a drive shaft, a shaft to be driven positioned in axial alignment with the drive shaft, a liquid filled housing carried by the drive shaft and rotatable therewith, and a wobbler unit wobble-mounted in the housing and adjustably associated with the driven shaft whereby when positioned in one position said wobbler unit will rotate freely about said driven shaft, but when moved to other positions will be caused to wobble in degree according to its adjusted position and apply torque to the shaft to be driven according to the resistance of the liquid, a sleeve having trunnion bearing on the shaft to be driven, means for freely rotatably mounting the sleeve in the wobbler unit whereby said unit may freely rotate about said sleeve when said sleeve is in concentric relation to the shaft-to-be-driven, and means to tilt the sleeve out of such concentric relation and cause the same to wobble and apply torque to said shaft-to-be-driven.

6. In apparatus of the class described, a drive shaft, a shaft to be driven positioned in axial alignment with the drive shaft, a liquid filled housing carried by the drive shaft and rotatable therewith, and a wobbler unit wobble-mounted in the housing and adjustably associated with the driven shaft whereby when positioned in one position said wobbler unit will rotate freely about said driven shaft, but when moved to other positions will be caused to wobble in degree according to its adjusted position and apply torque to the shaft to be driven according to the resistance of the liquid, a sleeve having trunnion bearing on the shaft to be driven, means for freely rotatably mounting the sleeve in the wobbler unit whereby said unit may freely rotate about said sleeve when said sleeve is in concentric relation with the shaft-to-be-driven, means to tilt the sleeve out of such concentric relation and cause the same to wobble and apply torque to said shaft-to-be-driven, said tilting means including a cam sleeve slidable on the shaft-to-be-driven and having a cam face, and a roller carried by the sleeve and adapted to be engaged by the cam face for the purposes specified.

7. In apparatus of the class described, a drive shaft, a shaft to be driven positioned in axial alignment with the drive shaft, a liquid filled housing carried by the drive shaft and rotatable therewith, a wobbler unit wobble-mounted in the housing and adjustably associated with the driven shaft whereby when positioned in one position said wobbler unit will rotate freely about said driven shaft, but when moved to other positions will be caused to wobble in degree according to its adjusted position and apply torque to the shaft to be driven according to the resistance of the liquid, a sleeve having trunnion bearing on the shaft to be driven, means for freely rotatably mounting the sleeve in the wobbler unit whereby said unit may freely rotate about said sleeve when said sleeve is in concentric relation with the shaft-to-be-driven, means to tilt the sleeve out of said concentric relation and cause the same to wobble and apply torque to said shaft-to-be-driven, and a two part sleeve fitting within the first mentioned sleeve and having portions for slide guiding the cam sleeve and preventing displacement thereof.

8. In apparatus of the class described, a driving element, a driven element, a resistance liquid impounding housing carried by one element and having resistance liquid therein, a wobbler unit carried by the other element and associated with the liquid impounding housing to be acted on by the liquid therein to cause said other element to rotate with the one element at varied speeds according to the degree of resistance of said liquid, said wobbler unit comprising a globular body and disks projecting therefrom to be engaged by the resistance liquid, and said housing having a globular body receiving portion and an extended annular chamber in which the disks move.

9. In apparatus of the class described, a driving element, a driven element, a resistance liquid impounding housing carried by one element and having resistance liquid therein, a wobbler unit carried by the other element and associated with the liquid impounding housing to be acted on by the liquid therein to cause said other element to rotate with the one element at varied speeds according to the degree of resistance of said liquid, said wobbler unit comprising a globular body and disks projecting therefrom to be engaged by the resistance liquid, said housing having a globular body receiving portion and an extended annular chamber in which the disks move, and at least one abutment wall obstructing free liquid circulation in the extended housing portion and associated with the disks to permit wobble movement in the housing extension but prevent rotation of said disks relatively to said housing.

10. In apparatus of the class described, a driving element, a driven element, a resistance liquid impounding housing carried by one element and having resistance liquid therein, a wobbler unit carried by the other element and associated with the liquid impounding housing to be acted on by the liquid therein to cause said other element to rotate with the one element at varied speeds according to the degree of resistance of said liquid, said wobbler unit comprising a globular body and a pair of dished disks carried by the globular body and projecting therefrom to be engaged by the resistance liquid, and said housing having a globular body receiving portion and an extended annular chamber in which the dished disks move, and an annular ring secured in the housing and separating the extended chamber into two annular liquid impounding chambers each accommodating one of the said dished disks.

11. In apparatus of the class described, a driving element, a driven element, a resistance liquid impounding housing carried by one element and having resistance liquid therein, a wobbler unit carried by the other element and associated with the liquid impounding housing to be acted on by the liquid therein to cause said other element to rotate with the one element at varied speeds according to the degree of resistance of said liquid, said wobbler unit comprising a globular body and a pair of dished disks carried by the globular body and projecting therefrom to be engaged by the resistance liquid, and said housing having a globular body receiving portion and an extended annular chamber in which the dished disks move, and an annular ring secured in the housing and separating the extended chamber into two annular liquid impounding chambers each accommodating one of the said dished disks, the imaginary centers of the two dished disks and the center of the globular body being coincident.

12. In apparatus of the class described, a driving element, a driven element, a resistance liquid impounding housing carried by one element and having resistance liquid therein, a wobbler unit carried by the other element and associated with the liquid impounding housing to be acted on by the liquid therein to cause said other element to rotate with the one element at varied speeds according to the degree of resistance of said liquid, said wobbler unit comprising a globular body and a pair of dished disks carried by the globular body and projecting therefrom to be engaged by the resistance liquid, and said housing having a globular body receiving portion and an extended annular chamber in which the dished disks move, an annular ring secured in the housing and separating the extended chamber into two annular liquid impounding chambers each accommodating one of the said dished disks, and at least one abutment wall in each of the two annular chambers obstructing free liquid circulation therein and associated with the respective disk to permit wobble movement in the said chamber but prevent rotation relative to said housing, said abutment walls being positioned diametrically opposite.

13. In apparatus of the class described, a driving element, a driven element, a resistance liquid impounding housing carried by one element and having resistance liquid therein, a wobbler unit carried by the other element and associated with the liquid impounding housing to be acted on by the liquid therein to cause said other element to rotate with the one element at varied speeds according to the degree of resistance of said liquid, said wobbler unit comprising a globular body and disks projecting therefrom to be engaged by the resistance liquid, and said housing having a globular body receiving portion and an extended annular chamber in which the disks move, said globular body comprising a plurality of rings collectively presenting a globular outer surface, and said disks being clamped between the said rings to be carried by and move with said ring formed globular body.

14. In apparatus of the class described, a driving element, a driven element, a resistance liquid impounding housing carried by one element and having resistance liquid therein, a wobbler unit carried by the other element and associated with the liquid impounding housing to be acted on by the liquid therein to cause said other element to rotate with the one element at varied speeds according to the degree of resistance of said liquid, said wobbler unit comprising a globular body and a pair of dished disks carried by the globular body and projecting therefrom to be engaged by the resistance liquid, and said housing having a globular body receiving portion and an extended annular chamber in which the dished disks move, an annular ring secured in the housing and separating the extended chamber into two annular liquid impounding chambers each accommodating one of the said dished disks, the imaginary centers of the two dished disks and the center of the globular body being coincident, a sleeve having trunnion bearing on the shaft to be driven, means for freely rotatably mounting the sleeve in the wobbler unit whereby said unit may freely rotate about said sleeve when said sleeve is in concentric relation with the shaft-to-be-driven, and means to tilt the sleeve out of such concentric relation and cause the same to wobble and apply torque to said shaft-to-be-driven.

15. In apparatus of the class described, a driving element, a driven element, a resistance liquid impounding housing carried by one element and having resistance liquid therein, a wobbler unit carried by the other element and associated with the liquid impounding housing to be acted on by the liquid therein to cause said other element to rotate with the one element at varied speeds according to the degree of resistance of said liquid, said wobbler unit comprising a globular body and a pair of dished disks carried by the globular body and projecting therefrom to be engaged by the resistance liquid, and said housing having a globular body receiving portion and an extended annular chamber in which the dished disks move, an annular ring secured in the housing and separating the extended chamber into two annular liquid impounding chambers each accommodating one of the said dished disks, the imaginary centers of the two dished disks and the center of the globular body being coincident, a sleeve having trunnion bearing on the shaft to be driven, means for freely rotatably mounting the sleeve in the wobbler unit whereby said unit may freely rotate about said sleeve when said sleeve is in concentric relation with the shaft-to-be-driven, means to tilt the sleeve out of such concentric relation and cause the same and the wobbler unit to wobble, and apply torque to said shaft-to-be-driven, said tilting means including a cam sleeve slidable on the shaft-to-be-driven and having a cam face, and a roller carried by the sleeve and adapted to be engaged by the cam face for the purposes specified.

16. In apparatus of the class described, a drive shaft, a shaft-to-be-driven positioned in axial alignment with the drive shaft, a liquid tight casing enclosing the adjacent ends of the shafts, said drive shaft having an enlarged head on the end thereof adjacent the shaft-to-be-driven, a thrust bearing carried by the driving shaft head and forming bearing for the adjacent shaft end, a liquid filled housing secured to and rotatable with said drive shaft head, and a wobbler unit wobble-mounted in the housing and adjustably associated with the driven shaft whereby when positioned in one position said wobbler unit will rotate freely about said driven shaft, but when moved to other positions will be caused to wobble in degree according to its adjusted position and apply torque to the shaft to be driven according to the resistance of the liquid.

17. In apparatus of the class described, a driving element, a driven element, a resistance liquid impounding housing carried by one element and having resistance liquid therein, a wobbler unit carried by the other element and associated with the liquid impounding housing to be acted on by the liquid therein to cause said other element to rotate with the one element at varied speeds according to the degree of resistance of said liquid, said wobbler unit comprising a globular body and a pair of dished disks carried by the globular body and projecting therefrom to be engaged by the resistance liquid, and said housing having a globular body receiving portion and an extended annular chamber in which the dished disks move, an annular ring secured in the housing and separating the extended chamber into two annular liquid impounding chambers each accommodating one of the said dished disks, said housing being formed of two parts flange secured together to form therebetween said extended annular chamber and said globular body, and said annular ring being clamped between said housing flanges.

18. In apparatus of the class described, a drive shaft, a shaft-to-be-driven positioned in axial alignment with the drive shaft, a liquid tight casing enclosing the adjacent ends of the shafts, said drive shaft having an enlarged head on the end thereof adjacent the shaft-to-be-driven, a thrust bearing carried by the driving shaft head and forming bearing for the adjacent shaft end, a liquid filled housing secured to and rotatably with said drive shaft head, a wobbler unit wobble-mounted in the housing and adjustably associated with the driven shaft whereby when positioned in one position said wobbler unit will rotate freely about said driven shaft, but when moved to other positions will be caused to wobble in degree according to its adjusted position and apply torque to the shaft-to-be-driven according to the resistance of the liquid, means to tilt-adjust the position of said wobbler unit, said tilting means including a cam sleeve slidable on the shaft-to-be-driven and having a cam face, a roller carried by the sleeve and adapted to be engaged by the cam face, said liquid tight casing being formed in two parts flange secured together, said parts constituting a main casing body and a casing extension, a centrally apertured partition wall secured between the flanges of the casing parts and having lubricant passages therethrough, an anti-friction bearing for the liquid filled housing mounted in said partition wall aperture, and control lever devices mounted in and accessible from without the casing extension and having connection with said slidable sleeve to slide the same upon the shaft-to-be-driven.

19. In apparatus of the class described, a drive shaft, a shaft-to-be-driven positioned in axial alignment with the drive shaft, a liquid tight casing enclosing the adjacent ends of the shafts, said drive shaft having an enlarged head on the end thereof adjacent the shaft-to-be-driven, a thrust bearing carried by the driving shaft head and forming bearing for the adjacent shaft end, a liquid filled housing secured to and rotatable with said drive shaft head, a wobbler unit wobble-mounted in the housing and adjustably associated with the driven shaft whereby when positioned in one position said wobbler unit will rotate freely about said driven shaft, but when moved to other positions will be caused to wobble in degree according to its adjusted position and apply torque to the shaft-to-be-driven according to the resistance of the liquid, said wobbler unit comprising a globular body and a pair of dished disks carried by the globular body and projecting therefrom to be engaged by the resistance liquid, and said housing having a globular body receiving portion and an extended annular chamber in which the dished disks move, an annular ring secured in the housing and separating the extended chamber into two annular liquid impounding chambers each accommodating one of the said dished disks, the imaginary centers of the two dished disks and the center of the globular body being coincident, a sleeve having trunnion bearing on the shaft-to-be-driven, means for freely rotatably mounting the sleeve in the wobbler unit whereby said unit may freely rotate about said sleeve when said sleeve is in concentric relation to the shaft-to-be-driven, means to tilt the sleeve out of such concentric relation and cause the same to wobble and apply torque to said shaft-to-be-driven, said tilting means including a cam sleeve slidable on the shaft-to-be-driven and having a cam face, and a roller carried by the sleeve and adapted to be engaged by the cam face for the purposes specified.

20. In apparatus of the class described, a driving element including a resistance liquid impounding housing having resistance liquid therein, a driven element, a wobbler unit carried by the driven element and associated with the liquid impounding housing to be acted on by the liquid therein to cause said driven element to rotate with the driving element at varied speeds according to the degree of resistance of said liquid, said wobbler unit comprising a globular body and disks projecting therefrom to be engaged by the resistance liquid, and said housing having a globular body receiving portion and an extended annular chamber in which the disks move.

LEONARD KENNETH HEINER.
WILLIAM McKINLEY MOORE.